United States Patent Office 3,843,394
Patented Oct. 22, 1974

3,843,394
PHOTOSENSITIVE MEMBER
Hirohiko Katayama, Tokyo, Hiroshi Hanada, Yokohama, and Masanao Kasai, Tokyo, Japan, assignors to Canon Kabushiki Kaisha, Tokyo, Japan
Filed Oct. 4, 1972, Ser. No. 294,797
Claims priority, application Japan, Oct. 11, 1971, 46/80,010; May 11, 1972, 47/46,638
Int. Cl. C23c 11/00, 13/00
U.S. Cl. 117—106 A    14 Claims

ABSTRACT OF THE DISCLOSURE

A photosensitive member comprising fundamentally a support layer and a chalcogen glass layer composed of an amorphous chalcogen glass containing at least one sulfur group element selected from the group consisting of S, Se and Te, the chalcogen glass layer containing 5–40 atomic percent of Ge and/or Si (in case of Ge and Si, the total amount of Ge and Si is 5–40 atomic percent), and the chalcogen glass layer being produced by vapor-depositing chalcogen glass on a support layer, can be improved by a procedure that the support layer temperature is kept at a high temperature as 200°–450° C. for a period of time ranging from $1/10$ to $7/10$ of the total vapor-depositing time.

BACKGROUND OF THE INVENTION

Field of the Invention

The present invention relates to a photosensitive member useful for producing a tough chalcogen glass pattern capable of strongly adhering to a desired support.

Description of the Prior Art

A conventional process for producing an image pattern using a prior art chalcogen glass is as described below. A thin film of chalcogen glass is formed on an appropriate support by vapor deposition technique. Upon the formed chalcogen glass layer is formed a photoresist layer, followed by exposing to a light pattern through an original pattern. The unexposed portion of the photoresist layer is selectively removed by etching to make a chalcogen glass layer open. The chalcogen glass layer thus made open at the unexposed portion is selectively dissolved and removed by an alkali solvent. Then, the photoresist layer at the exposed portion is removed by an appropriate technique to produce a relief pattern of chalcogen glass.

The chalcogen glass pattern is useful as a resist member because of its good resistance to dissolution, particularly to acid, in addition, useful as a photomask because of its non-transparence. Chalcogen glass is a general term for an amorphous material (in glassy state) comprising at least one element selected from the Group VI elements consisting of sulfur (S), selenium (Se) and tellurium (Te), as opposed to a conventional oxide glass. A well known chalcogen glass is for example arsenic trisulfide ($As_2S_3$) and arsenic triselenide.

The chalcogen glass which has been heretofore used for a formation of pattern is a binary compound such as $As_2S_3$, $As_2Se_3$ and $Sb_2S_3$ due to its good alkali solubility and easy film shapability. A thin and uniform chalcogen glass layer can be formed by vapor-depositing these chalcogen glass. The vapor-deposition is carried out by placing the chalcogen glass in a boat (sample holder) and heating the boat. The temperature of the boat is kept above the melting point of the chalcogen glass. During this vapor deposition, the temperature of the support on which the chalcogen glass layer is to be formed is ordinarily kept in the range of 0–50° C. in order to avoid a revaporization, decomposition and crystallization of the chalcogen glass. The deposition rate is ordinarily 200–3000 millimicrons/minute in consideration of the vaporization property of the prior art chalcogen glass and economical efficiency. However, the chalcogen glass layer formed under such deposition condition has a poor adhesion with a support, especially, with a glass support. For example, the adhesion strength of $As_2S_3$ film deposited on a borosilicate glass is 0.9 kg. per cm.$^2$ and very weak. The prior art chalcogen layer is not stable in water so that when allowed to stand in water for one day and night, it is peeled from the support.

From such fact the chalcogen pattern formed shows very poor properties, after formation of the pattern by alkali etching, and during the use of such pattern. Especially in the case of the pattern formed in micron order thickness, which is to be used as a photomask useful in a fabrication of semiconductor integrated circuits such IC and LSI, it is difficult to produce a sufficiently good image pattern because the chalcogen glass film is apt to peel from the support in the steps such as etching in alkali solution and washing. On the other hand, Knoop hardness of $As_2S_3$ is about 40 so that the coating formed of this material is very susceptible to damage. The master plate for photographic printing, IC photomask and the like which is formed from a material of low hardness are of poor durability. It is difficult to produce the durable products.

SUMMARY OF THE INVENTION

According to the present invention, there is provided a photosensitive member comprising fundamentally a support layer and a chalcogen glass layer composed of an amorphous chalcogen glass containing at least one sulfur group element selected from the group consisting of S, Se and Te, the chalcogen glass layer containing 5–40 atomic percent of Ge and/or Si (in case of Ge and Si, the total amount of Ge and Si is 5–40 atomic percent), and the chalcogen glass layer being produced by vapor-depositing chalcogen glass on a support layer, characterized in that the support layer temperature is kept at a high temperature as 200–450° C. for a period of time ranging from $1/10$ to $7/10$ of the total vapor-depositing time.

An object of this invention is to eliminate such drawbacks of the prior art material by using a specific chalcogen glass and preparing the chalcogen glass layer under a specific condition.

Another object of this invention is to provide a formation of chalcogen glass layer having good adhesion with a support.

Further object of this invention is to provide a formation of the chalcogen glass layer excellent in a mechanical strength.

Still another object of the present invention is to provide a chalcogen glass pattern of excellent durability.

DESCRIPTION OF THE PREFERRED EMBODIMENTS

Figure 1:
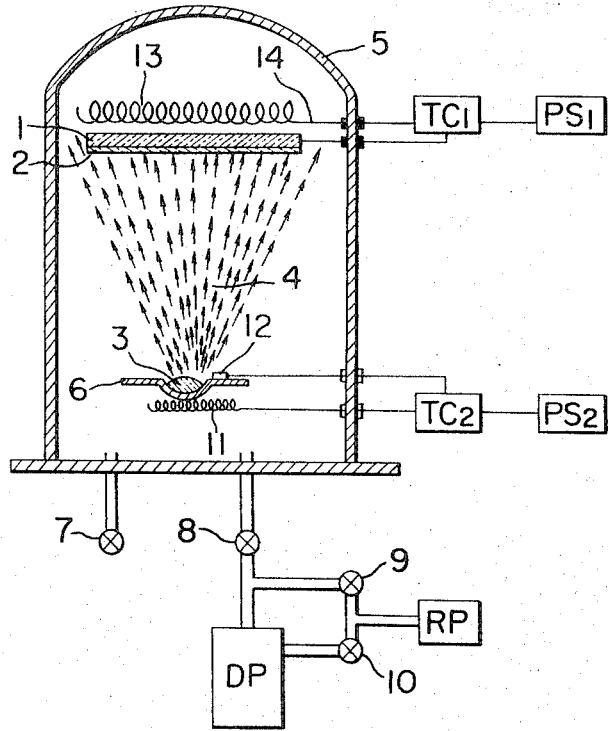
FIG. 1 shows schematically an example of apparatus for producing the photosensitive member according to the present invention.

The chalcogen glass layer of the present invention is prepared by using a specific chalcogen glass under a specific deposition condition. The specific chalcogen glass is prepared by adding 5–40 atomic percent Ge and/or Si to a chalcogen glass conventionally used. The specific depositing condition is that the temperature of the support layer is kept at a temperature of 200° C.–450° C. for a period of time ranging from $1/10$ to $7/10$ of the total depositing time necessary to form a desired thickness of the chalcogen glass layer, in the process for vapor-depositing the chalcogen glass on the support layer. Improved adhesion of the chalcogen glass layer to the support layer and improved mechanical strength of the chalcogen glass layer are obtained by keeping at the high temperature of 200° C.–450° C.

The structural mechanism of relation between Ge and/or Si contained in the chalcogen glass and adhesion and mechanical strength is not yet clearly known, but it may be hypothesized that the addition of Ge and/or Si effects a structural change to a three-dimensional network from a two-dimensional network which has been considered for an ordinary structure of the chalcogen glass. This three dimensional network is not understood to be entirely of an orderly position because the chalcogen glass is amorphous (in a glassy state).

It is understood that the chalcogen glass can be deposited more density on the support layer only when the support layer is maintained at the high temperature of 200° C.–450° C. during a chalcogen deposition.

The improvement of adhesion and mechanical strength of the chalcogen glass layer formed by depositing the chalcogen glass containing Ge and/or Si at the temperature of 200° C.–450° C. of the support layer is reviewed by comparing with the results of tests where the chalcogen glass containing Ge or Si is deposited under ordinary condition, i.e. the temperature of 0°–50° C. of the support layer, and the chalcogen glass containing neither Ge nor Si is deposited under the inventive condition, i.e., at the temperature of 200° C.–450° C. of the support layer. From these review it is understood that the improved mechanical strength is mainly due to the addition of Ge or Si, and the improved adhesion is mainly attributing to the temperature of the support layer during chalcogen glass deposition. The increase cannot be expected from the data ob- the chalcogen glass is unexpectedly high to support sufficiently the advantage and utilization of the present invention. The increase can not be expected from the data obtained in the above mentioned test of the prior art chalcogen glass and the conventional process. The chalcogen glass used for this invention may be an amorphous (i.e. in glassy state) substance containing at least sulphur Group elements (S, Se and Te), and 5–40 atomic percent of Ge and/or Si, and its melting point may be not less than 400° C. Typical chalcogen glass useful for the present invention is a simple substance glass such as glassy Se and glassy S, binary glass such as As-S system, As-Te system, As-Se systems, Se-S system, Se-Te system, Sb-Se system, Sb-Te system, Bi-Se system, Bi-S system, and Bi-Te system, ternary chalcogen glass such as As-S-Te system, As-Se-Te system, Sb-As-S system and As-S-Se system, and quaternary chalcogen glass such as As-S-Se-Te system and As-S-Se-Ge system, and these glasses contains additionally Ge and/or Si.

Alternatively, various elements may be preliminarily added as an activator to such chalcogen glass. The effective element to be added may be I, Br, P and Tl. The amount of Ge and/or Si to be added can be varied within a range of 5 atomic percent–40 atomic percent. Where the amount is not more than 5 atomic percent, the ordinary melting point of the chalcogen glass is so low that when the support layer is at the temperature above 200° C., the vapor-pressure of the chalcogen glass is high to reduce and limit the deposition on the support surface, and thereby, the deposited coating is so thin that the adhesion and mechanical strength of the deposited coating cannot be improved. Where the amount of addition is not less than 40 atomic percent, the melting point of the chalcogen glass is extremely high and the vapor source temperature needs to be elevated enough to vaporize. At such elevated temperature as near 1000° C., the vapor pressure difference between the composition elements is remarkable and moreover the chalcogen glass is liable to decompose and thereby the difference of composition between the coating and the material to be deposited becomes remarkable. As the result, the desired coating cannot be obtained. In such case, the coating contains more crystallite than glassy, thereby, it becomes brittle and pin hole defect is apt to occur. The most excellent result can be obtained when the additional amount is in a range of 7–30 atomic percent.

The procedure of vapor depositing the chalcogen glass containing Ge and/or Si is concretely described below. A chalcogen glass containing Ge and/or Si and a support layer are introduced into a fixed position in a vapor-deposition apparatus. Almost of various known vapor-deposition processes and vapor-deposition apparatuses can be used in accordance with the present invention. The present invention is illustrated using typical one of vapor-deposition apparatus. The vapor-deposition is shown in FIG. 1.

The support layer, glass base plate 1 of which the surface is clearly polished is set at the upper position in a bell jar 5. The chalcogen glass 3 is disposed in a vaporization boat 6 at the bottom position of the bell jar, in face of the glass base plate 1. Before the depositing step, a leak valve 7 is open and the bell jar is in an atmospheric pressure. The vapor-deposition preparation begins as follows. First, leak valve 7 is shut and main valve 8 and sub valve 9 are open (in this time sub valve 10 is shut). The bell jar is evacuated by a vacuum pump RP. The evacuation is continued until the pressure of the bell jar becomes $10^{-2}$–$10^{-3}$ mm. Hg. Then, the auxiliary valve 9 is shut, and the auxiliary valve 10 is open, the vacuum pump is running. The air in the bell jar is evacuated through an oil diffusion pump DP. The evacuation decreases the pressure in the bell jar to $10^{-5}$–$10^{-7}$ mm. Hg. When a boat 6 is heated by a heater 11, the chalcogen glass evaporates into a vapor 4 to deposit the chalcogen glass for forming layer 2 on the glass base plate. The heater 11 is energized by a current from a power source PS2. The temperature of the boat is monitored by a thermometer 12. The thermometer 12 is connected with a temperature controlling device TC2 provided between the heater 11 and the source PS2 so as to adjust the temperature of the boat by controlling the current from the source PS2. The temperature of the vaporization boat is ordinarily kept in the range of 400° C.–800° C. On the other hand, the glass base plate is heated by a heater 13. (In a prior art apparatus, there is a cooling device to keep a base plate at a low temperature, in stead of the heater.) The heater 13 is operated by a power source PS1, a temperature controller TC, and a thermometer 14 so as to heat the glass base plate at a desired temperature.

Referring to FIG. 1, the formation of the chalcogen glass layer of the present invention is described. The glass base plate is heated at a high temperature of 200° C.–450° C. for a period of time of $1/10$–$7/10$ of total depositing time. Because of very high temperature of the base plate as compared with a conventional procedure, that is, 0–50° C., the chalcogen glass is deposited in an extraordinary form. The vapor of the chalcogen glass collides with the surface of the glass base plate to solidify on the surface of the base plate. A part of the solidified chalcogen glass revaporizes due to the high temperature of the glass base plate into vapor. Deposition is carried out on the surface of the glass base plate in such a manner that the vapor of the chalcogen glass continuously collides and partially revaporizes. As a result, a dense and mechanically strong chalcogen glass layer is formed. The deposition is continued until the chalcogen glass layer of the desired thickness is formed. When the support is kept at the high temperature during a whole period from beginning to finishing of deposition, the deposition rate of the chalcogen glass is low due to the revaporization, and about 0.1 millimicrons/min.–100 millimicrons/min. Accordingly, in case of producing a relatively thick chalcogen glass layer in short time, or commercial production of the chalcogen glass layer, the practically effective procedure is that the deposition is carried out by keeping the temperature of the base plate at the high temperature only for one part of the whole deposition period, and for the other period at the low temperature, i.e. below 200° C.

The deposition rate is 100–3000 millimicrons/min. when the temperature of the base plate is 0° C.–50° C., and 10–1000 millimicrons/min. when the temperature is 80–150° C. The period of time within which the base plate is held at the high temperature is preferably the period of $2/10$–$5/10$ of the total depositing time. The high temperature is preferably 280–320° C. The low temperature in the remaining period is preferably 50–200° C., more preferably 80° C.–150° C. There are several different periods for holding at the high temperature for a partial period of the total depositing time, that is, (1) at the initial time,
(2) one time between the initial period and the final period,
(3) from the intermediate time to the final time,
(4) twice or more times interval during the deposition period.

These methods may be optionally applied. However, the method of enabling to produce a chalcogen glass layer with good adhesion and mechanical strength is (5) that the base plate is held at the high temperature from the initial to the final time.

The above mentioned method (1) can produce the resultant similar to the method (5). In consideration of the practice of producing the chalcogen glass layer, the method (1) appears most effective. The methods (2) and (3) can impart a sufficient mechanical strength to the chalcogen glass layer, they are defective in the adhesion property as compared with the methods (1) and (5). However, when the initial temperature of the support layer is held at 80° C.–200° C., such defect is almost eliminated. Such phenomena can be observed in applying to the method (4). The chalcogen glass obtained in accordance with the present invention possesses an excellent film property such that it has pretty good adhesion, high density and high hardness, and the defectless film can be produced.

The layer of a conventional chalcogen glass such as $As_2S_3$, $As_2Se_3$, $Sb_2S_3$ and the like has adhesion strength around 1 kg./cm.$^2$, the Knoop hardness below about 100.

From a practical point of view, the chalcogen glass layer usually needs adhesion strength above 10 kg./cm.$^2$ and the film Knoop hardness above about 100 and difficulty in peeling both layers from each other when allowed to stand in water, in order to produce a sufficiently durable chalcogen glass pattern. As shown in the reference examples and the working examples infra, the chalcogen glass layer of the present invention has adhesion strength above about 10 kg./cm.$^2$, and Knoop hardness above about 100. In addition, the produced chalcogen glass pattern is not peeled from the support layer when allowed to stand in water for a long time. Because of its excellent properties, the chalcogen glass layer of the present invention is useful, particularly, in producing a chalcogen glass pattern with high resolution, and in producing a repeatedly usable chalcogen glass pattern such as a photomask. The chalcogen glass layer is formed ordinarily in the thickness of 100–2000 millimicrons. Particularly in case of fabrication of a high resolution pattern, it is formed in the thickness of 200–800 millimicrons. The support layer is appropriately selected from metal, glass, resin, sheet, ceramics and the like. For example, when the support is transparent, the produced pattern can be used as a photomask.

Figure 2:
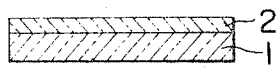
FIG. 2 shows diagrammatically an embodiment of the photosensitive member according to the present invention.
Figure 3:
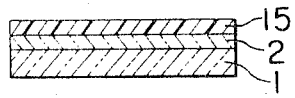
FIG. 3–FIG. 7 show each step of a process of formation of a pattern according to a photoresist method by using the photosensitive member of the present invention.
Figure 4:
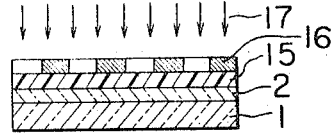
Figure 5:
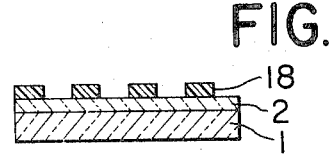
Figure 6:
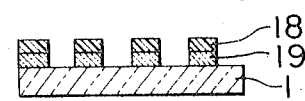
Figure 7:
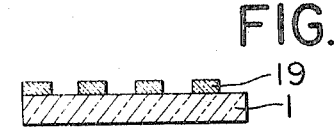

The photosensitive member of the present invention is described referring to the drawing. FIG. 2 shows a preferred embodiment of the photosensitive member of the present invention. The photosensitive member comprises a support layer 1 and a chalcogen glass layer 2. FIG. 3–FIG. 7 show each of steps for producing a chalcogen glass pattern using the photosensitive member of FIG. 2. FIG. 3 shows a member comprising a support layer (glass plate) 1, chalcogen glass layer 2 and a photoresist layer 15 formed by applying a photoresist solution and drying. This photosensitive member is exposed to a light 17 through an original pattern 16 (referring to FIG. 4), the photoresist of the unexposed portion is selectively dissolved and removed to produce a photoresist pattern 18 (referring to FIG. 5). Then, the chalcogen glass layer in the unexposed portion is selectively dissolved and removed by washing, drying and treating with an alkali solution to produce a chalcogen glass pattern 19 (referring to FIG. 6). If desired, a photoresist pattern is removed by a conventional technique (referring to FIG. 7). The resultant pattern is used as a photomask.

As a photoresist, any substance conventionally used can be appropriately used. Typical photoresist is KPR (Kodak Photo Resist), KMER (Kodak Metal Etch Resist), TPR (photoresist available from Tokyo Applied Chemistry), Shipley AZ 1350 (trade name; available from Shipley Corp.), KTFR (Kodak Thin Film Resist). The reagent which may be used to remove a photosensitive photoresist in the exposed portion is trichlene, methyl chloride, AZ remover (trade name, available from Shipley Corp.), hot sulphuric acid, or plasma etching.

As alkali solution may be used to selectively dissolve and remove the chalcogen glass. A typical alkali solution is an aqueous or alcoholic solution of hydroxide of alkali metal such as Li, Na and K; or an aqueous solution of hydroxide of alkali earth metal such as Ba.

Figure 8:
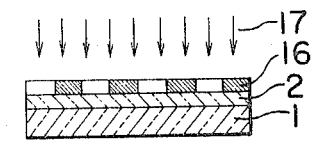
FIG. 8 and FIG. 9 show each step of another step for forming a pattern by using the photosensitive member of the present invention.
Figure 9:
Figure 10:
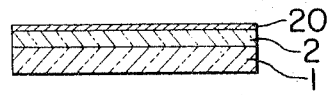
FIG. 10 shows diagrammatically another embodiment of photosensitive member of the present invention.

An alternative process for producing a chalcogen glass pattern from the photosensitive member of FIG. 2 is illustrated referring to FIG. 8 and FIG. 9. The photosensitive member is exposed to light pattern 17 through an original pattern 16 (FIG. 8). The pattern exposure takes place by a strong light. The exposed portion of the chalcogen glass layer is more soluble in an alkali solution than the unexposed portion. The exposed portion is selectively dissolved and removed by subjecting the photosensitive member to an alkali solution etching treatment to produce the chalcogen glass pattern as shown in FIG. 9. The photosensitive member comprising an additional metal layer 20 on the chalcogen glass layer, together with a chalcogen glass layer and a support layer as shown in FIG. 10 may be used to produce a pattern. The photosensitive member comprising additionally the metal layer has several special characteristics. For example, the light exposure produces a diffusion of metal into the chalcogen glass at the exposed portion to make the chalcogen glass insoluble in an alkali solution. After removing the remaining metal layer and treating with an alkali solution, a negative pattern is obtained. The chalcogen glass pattern thus obtained has a high resolution and high optical density such that it is advantageous particularly in use for information recording, and photomask. It is understood that these advantages result from the facts that the diffused metal in the exposed portion increases the resistance of the chalcogen glass against alkali solution to produce a remarkable difference of alkali solubility between the exposed portion and the unexposed portion of the chalcogen glass layer, which enables to etch completely and selectively, the chalcogen glass pattern thus produced contains metal to increase an optical density, and the chalcogen glass pattern can be produced directly from the photosensitive member without a photoresist.

A typical metal usable for this metal layer is Ag, Zn, Cd, Pb, Cr, Cu, In, Sn and Ni. Among them Ag, Cu or alloy containing these metals is preferable. The thickness of the metal layer or the chalcogen glass layer containing the metal is preferably 10–200 millimicrons.

Figure 11:
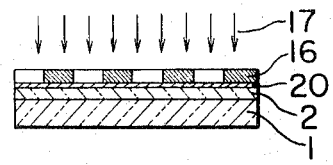
FIG. 11–FIG. 15 show each step of a further process for producing a pattern by using a photosensitive member.
Figure 12:
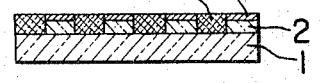
Figure 13:
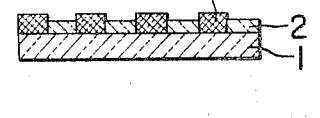
Figure 14:
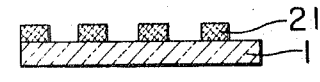

Referring to FIG. 11–FIG. 14, the process for producing a chalcogen glass pattern from the photosensitive member is described as follows. The photosensitive member is exposed to a light pattern 17 through an original pattern 16 as illustrated in FIG. 11. As shown in FIG. 12, the metal diffuses into the chalcogen glass layer at the exposed portion to produce a diffusion portion 21, and the metal layer remains unchanged at the unexposed portion. The remaining metal layer at the unexposed portion is dissolved and removed by subjecting the member to an acid treatment with acid solution such as aqueous hydrofluoric acid, nitric acid, hydrochloric acid, sulfuric acid, or a mixture thereof such as a mixture of hydrofluoric acid and nitric acid, aqua regia and a mixture of bichronic acid and sulfuric acid, as shown in FIG. 13. Then, the chalcogen glass at the unexposed portion is dissolved and removed by alkali treatment to produce the chalcogen glass pattern containing the metal as shown in FIG. 14.

Figure 15:
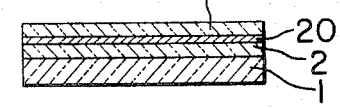
Figure 16:
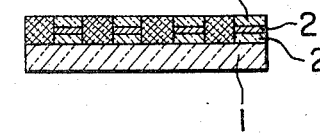
FIG. 16 shows a further embodiment of photosensitive member according to the present invention.

Further alternative embodiment of the present invention is a structure shown in FIG. 15, wherein the upper chalcogen glass layer 2' is additionally formed on the metal layer of the photosensitive member shown in FIG. 10. This embodiment of the photosensitive member has a special merit that the efficiency of metal diffusion is increased by sandwiching the metal layer between two chalcogen glass layers to raise a sensitivity. The photosensitive member can be in a similar manner for the member of FIG. 10 used to produce a chalcogen glass pattern, except for removing the remaining chalcogen glass layer 21 on the remaining metal layer by an alkali solution before removing the remaining metal layer 20. The exposure light for formation of the chalcogen glass pattern may be various radiation such as infra red ray, visible ray, ultra violet ray, electron beam, α-ray or ion-charged particle ray, because the sensitivity range of the chalcogen glass extends to near infra red range. The upper chalcogen glass layer may be composed of an ordinary chalcogen glass or the Ge or Si containing chalcogen glass of the present invention. The chalcogen glass pattern obtained from the photosensitive member of the present invention has a wide-ranged utilization, in use for such a recording members, photomask, hologram, electric resistance pattern, and resist member. The present invention is further illustrated by the following reference examples and the working examples *infra*.

REFERENCE EXAMPLE 1

Chalcogen glass layers are formed on a glass base plate using ten different composite chalcogen glass containing neither Ge nor Si, and ten chalcogen glass containing additionally Ge or Si. These chalcogen glass layers are formed under the following two different conditions.

(i) The chalcogen glass is deposited on the surface of glass base plate to form a layer about 500 millimicrons thick under the condition that pressure is $10^{-5}$ mm. Hg, the temperature of glass base plate is 25–50° C. and the depositing time is 0.5–5 minutes.

(ii) The chalcogen glass layer about 500 millimicrons thick is formed on a glass base plate under the condition that pressure is $10^{-5}$ mm. Hg, the base plate is held at 350° C. for the period of 10 minutes from the beginning time for deposition, and decreases to 150° C. over the period of 10 minutes, and then is held at this temperature (150° C.) for 5–30 minutes.

40 species of chalcogen glass layers including 20 species formed under the two different conditions from 10 species of chalcogen glass containing neither Ge nor Si, and 20 species formed under two different conditions from 10 species of chalcogen glass containing Ge or Si are measured in respect with adhesion strength with glass base plate and Knoop hardness.

Test for adhesion strength

Where a metal plate having a fixed area is adhered to the surface of a chalcogen glass layer with a binder (epoxy resin) and the glass base plate is fixed, the metal plate is pulled at a constant speed with a coil. The strength when the chalcogen glass layer is peeled is measured by the expansion of the coil. The adhesion strength above 40 kg./cm.² cannot be measured due to the limitation of adhesion strength of the binder.

Test for Knoop hardness

The surface of the chalcogen glass layer is pressed by a diamond crystal indenter with a fixed weight to make an indention of diamond shaped. The size of the indention is measured by a microscope to determine Knoop hardness. However, the Knoop hardness is measured on the polished surface of bulk chalcogen glass because the chalcogen glass layer formed in the reference example is thin so that more complicated procedure is necessary. Accordingly the difference between the conditions (i) and (ii) as to Knoop hardness is not shown in the following table.

In Table 1, the mark "—" denotes that the layer cannot be formed or cannot be measured.

TABLE 1

| Chalcogen glass composition | Depositing condition | Adhesion strength (kg./cm.²) | Knoop hardness |
|---|---|---|---|
| $As_{40}S_{60}$ | i / ii | 0.9 / 1.5 | 100 |
| $As_{33}S_{50}Ge_7$ | i / ii | 4.0 / 31.0 | 120 |
| $As_{14}S_{29}Se_{57}$ | i / ii | 1.5 / 2.0 | 75 |
| $As_{12}S_{24}Se_{47}Ge_{17}$ | i / ii | 6.5 / >40.0 | 150 |
| $Sb_{40}Se_{60}$ | i / ii | 1.1 / 3.7 | 90 |
| $Sb_{33}Se_{50}Ge_7$ | i / ii | 5.0 / 35.0 | 130 |
| $Si_{25}As_{25}Te_{50}$ | i / ii | 6.5 / >40.0 | 167 |
| $As_{34}Te_{66}$ | i / ii | 1.5 / 4.0 | 92 |
| $Ge_{10}As_{20}Te_{70}$ | i / ii | 5.0 / 35.0 | 111 |
| $As_{23}Te_{77}$ | i / ii | 0.7 / 6.5 | 77 |
| $Si_{15}Ge_{10}As_{25}Te_{25}S_{25}$ | i / ii | 3.0 / >40.0 | 179 |
| $As_{34}Te_{33}S_{33}$ | i / ii | 3.2 / 5.5 | 89 |
| $Ge_{30}P_{10}S_{60}$ | i / ii | 7.5 / >40.0 | 185 |
| $P_{15}S_{85}$ | i / ii | 4.0 / 8.5 | 73 |
| $Ge_{40}S_{60}$ | i / ii | 7.2 / >40.0 | 179 |
| $S$ | i / ii | 1.0 / — | — |
| $Ge_{28}Sb_{12}Se_{60}$ | i / ii | 2.7 / >40.0 | 150 |
| $Sb_{17}S_{83}$ | i / ii | 1.5 / 2.5 | 61 |
| $Ge_{33}As_{12}Se_{55}$ | i / ii | 5.5 / >40.0 | 171 |
| $As_{18}Se_{82}$ | i / ii | 0.9 / 2.0 | 60 |

In Table 1, the chalcogen glass layer is formed by depositing the chalcogen glass under the condition (i) or (ii).

The result shown in Table 1 supports the fact that the chalcogen glass layer formed in accordance with the present invention is unexpectedly excellent with respect to adhesion strength and Knoop hardness, both of the inclusion of Ge or Si and the deposition condition (ii) contributes to the advantageous property of the photosensitive member of the present invention.

REFERENCE EXAMPLE 2

The amount of Ge in $As_2Se_3$ chalcogen glass is varied, and the changes of adhesion strength and Knoop hardness due to the varied amount of Ge are measured.

Figure 17:
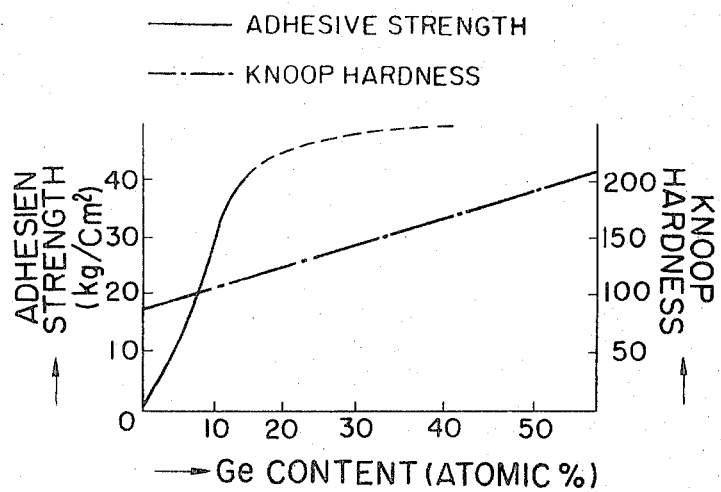
FIG. 17 is a graph showing a relation between Ge content and adhesion strength and Knoop hardness.

For this purpose, the chalcogen glass layer of about 500 millimicrons thick is each formed by depositing the chalcogen glass on a glass base plate under the condition that pressure is about $10^{-5}$ mm. Hg, the glass base plate is held at about 320° C. for a period of 10 minutes from a beginning of deposition, and decreased gradually to 180° C. in 10 minutes, and held at this temperature (180° C.) for 10 minutes. The measurement methods for adhesion strength and Knoop hardness are similar to those in the Reference Example 1. The results are shown in FIG. 17. The adhesion strength is improved with the increased amount of Ge, indicating that the Ge amount is effective above about 5 atomic percent.

Example 1

Arsenic 15 g., sulfur 7 g., selenium 36.3 g., and germanium 8.7 g. were sealed in a quartz tube at a pressure of $10^{-6}$ mm. Hg, heated in an electric furnace to 980° C., kept at said temperature for 7 hours, cooled to 750° C. over a period of about 2 hours, taken out from the furnace and quenched in a cold water. The resulting chalcogen glass was weighed to take 300 mg. of chalcogen glass and heated at 500° C. for one minute at a pressure of $10^{-6}$ mm. Hg. The chalcogen glass was vaporized and deposited on a glass base plate kept at 30° C. in the thickness of about 300 millimicrons at a depositing rate of about 300 millimicrons/min. The resulting deposited film showed an adhesion strength of 4 kg./cm.² A minute pattern produced on the deposited chalcogen glass film had low strength so that it could not be used as a photomask member for IC.

On the other hand, a similar chalcogen glass was deposited on a glass base plate heated at 350° C. at a pressure of $10^{-6}$ mm. Hg. Immediately after beginning of depositing, a heater for heating the glass base plate was switched off and the glass base plate was allowed to cool and kept at temperatures of 350° C.–250° C. for 10 minutes. Heating temperature of the chalcogen glass was about 500° C. and depositing rate of chalcogen glass under this condition was 15 millimicrons/min. After depositing for 30 minutes, the resulting film was 280 millimicrons in thickness and the optical absorption end is somewhat shifted to a short wavelength side as compared with the chalcogen glass film formed at 30° C. of temperature of a glass base plate. The adhesion strength of the resulting chalcogen film was higher than 40 kg./cm.² and the surface structure was very hard. The resulting film was subjected to a series of procedure as illustrated in FIG. 4 to FIG. 7 to form a photomask for IC. The resulting photomask was used for forming a pattern on a silicon wafer by a close contacting method and was able to be used about 45 times without forming scratch.

Example 2

On the film as obtained in Example 1 was deposited silver at $10^{-6}$ mm. Hg in the thickness of about 60 millimicrons and was selectively irradiated by a 250 W mercury lamp to form silver diffusion in the chalcogen glass layer of fidelity to the light pattern. The distance between the mercury lamp and the chalcogen glass was about 20 cm. and the required time was about 90 seconds. Then, the remaining metal which did not take part in diffusion was dissolved and removed by a chromic acid mixture ($K_2Cr_2O_7$-$H_2SO_4$). Then the film was treated with an alcoholic KOH saturated solution to produce a clear pattern.

Example 3

A chalcogen glass of $As_{20}S_{15}Se_{50}Ge_{50}$ was deposited on a glass base plate at a pressure of $10^{-6}$ mm. Hg. Temperature of the glass base plate was 320° C. at the beginning of depositing and then cooled at a rate of average 2° C./min. and as the result, the glass base plate was kept at temperatures of 320° C.–200° C. for 60 minutes. The depositing rate of chalcogen glass was adjusted to average 2 millimicrons/min. and the depositing was effected for 145 minutes until the temperature was lowered down to room temperature (about 30° C.) to form a chalcogen glass film of about 290 millimicrons. The resulting film had characteristics similar to those in Example 1 and an adhesion strength of higher than 40 kg./cm.² A minute pattern was prepared by using the above-mentioned film to form easily a line of chalcogen glass of one micron in width.

The chalcogen glass of As-S-Se-Ge system as used in Examples 1–3 are effective in the present invention. It is particularly effective when the chalcogen glass composition ratio was set as $As_{10-50}S_{5-75}Se_{5-75}Ge_{5-40}$. In place of Ge, there may be used Si or Ge+Si.

Example 4

Germanium 28.8 g. and sulfur 19.2 g. were sealed in a quartz tube at a pressure of $10^{-6}$ mm. Hg, heated in an electric furnace at 870° C. for about 10 hours, then cooled to and kept at 600° C. for about 2 hours, taken out from the furnace and quenched in a cold water. The resulting chalcogen glass of $Ge_4S_6$ (about 350 mg.) was vapor-deposited on a glass base plate by using a depositing device at a pressure of $10^{-6}$ mm. Hg. In this case, temperature of the glass base plate was kept at 340° C. for 10 minutes at the beginning of depositing and then cooled at a rate of about 10° C./min. Heating temperature for the chalcogen glass was adjusted in such a way that the vapor-depositing rate was average 15 millimicrons/min. The resulting $Ge_4S_6$ film showed such a high adhesion strength that no peeling occurred in a pulling test at about 40 kg./cm.²

Example 5

A chalcogen glass of $Ge_{30}P_{10}S_{60}$ having Knoop hardness of about 185 was used to vapor-deposit on a glass base plate for forming a chalcogen glass layer. The vapor-depositing was effected at a pressure of $10^{-5}$ mm. Hg and temperature of the base plate was kept at 150° C. for 10 minutes after starting the vapor-depositing and then raised up to 400° C. in 5 minutes and kept at 400° C. for 5 minutes to form a chalcogen glass layer of about 400 millimicrons in thickness. The adhesion strength of the chalcogen glass layer was higher than 40 kg./cm.²

Example 6

A chalcogen glass of $Ge_{28}Sb_{12}Se_{60}$ (about 150 of Knoop hardness) was vapor-deposited on a magnesium oxide crystal plate of 30 mm. x 30 mm. and 2 mm. thick to form a chalcogen glass layer. The vapor-depositing was effected at a pressure of $10^{-5}$ mm. Hg with a base plate temperature of 300° C. for 60 minutes. The resulting chalcogen glass layer was 300 millimicrons in thickness and the adhesion strength to the base plate was higher than 40 kg./cm².

Example 7

A chalcogen glass of $Ge_{20}S_{80}$ was vapor-deposited on a glass base plate at a pressure of $10^{-5}$ mm. Hg at a base plate temperature of 350° C. kept for 5 minutes after the beginning of depositing and then for further 45 with decreasing the base plate temperature. The total depositing time was 50 minutes and the base plate temperature was 90° C. at the end of vapor-depositing. As the result, a chalcogen glass layer of 600 millimicrons in thickness and the adhesion strength between the layer and the base plate was higher than 40 kg./cm.² On the resulting chalcogen glass layer was vapor-deposited a silver layer of 60 millimicrons in thickness under the same condition as in Example 2 and then on the resulting silver layer there was vapor-deposited another chalcogen glass layer of $AsS_5$ having a thickness of 600 millimicrons at a base plate temperature of 30° C. for 5 minutes.

The surface of the resulting photosensitive member was scanned by argon laser beam which irradiation energy was about one Joule/cm.² and then soaked in a 0.5N aqueous sodium hydroxide to dissolve and remove the portion unexposed to the laser resulting in a relief pattern having projected thin lines of about one micron wide.

Example 8

A chalcogen glass of $As_2S_3Ge$ (about 120 of Knoop hardness) was vapor-deposited on a magnesium fluoride crystal plate of 100 mm. x 100 mm. and 3 mm. in thickness to form a chalcogen glass layer of 45 millimicrons in thickness. The vapor-depositing was effected at a pressure of $10^{-5}$ mm. Hg at a base plate temperature 270° C. for 30 minutes. The adhesion strength between the chalcogen glass layer and the base plate was 35 kg./cm.².

Example 9

The chalcogen glass and the base plate as used in Example 8 were used to form a chalcogen glass layer of 400 millimicrons in thickness at a pressure of $10^{-5}$ mm. Hg. The base plate temperature was kept at 310° C. for 3 minutes after the beginning of vapor-depositing, then cooled to 120° C. in one minute by using a water cooling plate, and further kept at 120° C. for 8 minutes. The adhesion strength of the resulting chalcogen glass layer was about 35 kg./cm.².

We claim:

1. A process for producing a photosensitive member having an amorphous chalcogen glass layer deposited on a support layer with a minimum strength of adhesion equal to 10 kg./cm.², said chalcogen glass cointaining 5–40 atomic percent of a first component selected from the group consisting of Ge, Si, and mixtures thereof and 60–95 atomic percent of a second component selected from the group consisting of S, Se, As-S, As-Te, As-Se, Se-S, Se-Te, Sb-Se, Sb-Te, Bi-Se, Bi-S, Bi-Te, As-S-Te, As-Se-Te, Sb-As-S, As-S-Se, and As-S-Se-Te and mixtures thereof, comprising vapor-depositing said chalcogen glass onto said support layer and simultaneously maintaining said support layer at a maximum temperature ranging from 200° C. to 450° C. for a period of time ranging from $1/10$–$7/10$ of the total vapor deposition time.

2. A process according to claim 1 in which the support layer temperature is maintained at the maximum temperature for a period of time $2/10$–$5/10$ of the total vapor-depositing time.

3. A process according to claim 1 in which the support layer is maintained at the maximum temperature from the start to $6/10$ of the vapor disposition time.

4. A process according to claim 1 in which the chalcogen glass is vapor deposited in a layer 100–2,000 millimicrons in thickness.

5. A process according to claim 1 in which the chalcogen glass is $As_{10-50}S_{5-75}Se_{5-75}Ge_{5-40}$.

6. A process according to claim 1 in which a metal layer is provided on the chalcogen glass layer, the metal layer composed of a metal capable of diffusing into the chalcogen glass layer when irradiated.

7. A process according to claim 6 in which the metal layer is 10–200 millimicrons in thickness.

8. A process according to claim 6 in which another chalcogen glass layer is provided on the metal layer.

9. A photosensitive member produced by the process of claim 1.

10. A photosensitive member produced by the process of claim 4.

11. A photosensitive member produced by the process of claim 5.

12. A photosensitive member produced by the process of claim 6.

13. A photosensitive member produced by the process of claim 7.

14. A photosensitive member produced by the process of claim 8.

References Cited
UNITED STATES PATENTS

| | | | |
|---|---|---|---|
| 3,047,438 | 7/1962 | Marinace | 117—106 A |
| 3,637,381 | 1/1972 | Hallman et al. | 96—36 |
| 3,658,582 | 4/1972 | Coker et al. | 117—106 A |
| 3,733,217 | 5/1973 | Seely et al. | 117—106 A |

DAVID KLEIN, Primary Examiner

U.S. Cl. X.R.

96—36, 67, 68, 88; 117—34

PO-1050
(5/69)

UNITED STATES PATENT OFFICE
CERTIFICATE OF CORRECTION

Patent No. 3,843,394      Dated October 22, 1974

Inventor(s) HIROHIKO KATAYAMA ET AL.

It is certified that error appears in the above-identified patent and that said Letters Patent are hereby corrected as shown below:

Column 3, lines 50-51 should read:

--tion. The increase of adhesion and mechanical strength of the chalcogen glass is unexpectedly high to support suffi- --

Column 7, line 49, "a" should read --as--.

Column 10, line 8, "$Ge_{50}$" should read --$Ge_{15}$--.

Signed and sealed this 24th day of December 1974.

(SEAL)
Attest:

McCOY M. GIBSON JR.      C. MARSHALL DANN
Attesting Officer         Commissioner of Patents